United States Patent [19]
Knowles et al.

[11] Patent Number: 5,982,711
[45] Date of Patent: Nov. 9, 1999

[54] DEVICE FOR READING DATA FROM OR WRITING DATA TO MAGNETIC STORAGE MEDIA AND A METHOD OF POSITIONING A TAPE HEAD RELATIVE TO THE MAGNETIC STORAGE MEDIA

[75] Inventors: Vernon L. Knowles; Donald J. Fasen, both of Boise, Id.; Richard D. Barndt, Fremont, Calif.

[73] Assignee: Hewlett-Packard Co., Palo Alto, Calif.

[21] Appl. No.: 08/869,649

[22] Filed: Jun. 5, 1997

[51] Int. Cl.[6] .......................... G11B 5/584; G11B 21/02; G11B 5/09
[52] U.S. Cl. ........................... 368/77.12; 360/53; 360/75
[58] Field of Search ................... 360/77.12, 75, 360/53, 78.01, 78.02, 121

[56] References Cited

U.S. PATENT DOCUMENTS

| | | | |
|---|---|---|---|
| 3,984,065 | 10/1976 | Bosetti et al. | 242/184 |
| 5,008,765 | 4/1991 | Youngquist | 360/77.12 |
| 5,262,908 | 11/1993 | Iwamatsu et al. | 360/77.12 |
| 5,432,652 | 7/1995 | Comeaux et al. | 360/77.12 |
| 5,450,257 | 9/1995 | Tran et al. | 360/76 |
| 5,488,525 | 1/1996 | Adams et al. | 360/77.12 |
| 5,523,904 | 6/1996 | Saliba | 360/77.12 |
| 5,572,392 | 11/1996 | Aboaf et al. | 360/126 |
| 5,574,602 | 11/1996 | Baca et al. | 360/77.12 |
| 5,629,813 | 5/1997 | Baca et al. | 360/77.12 |

Primary Examiner—Aristotelis M. Psitos
Assistant Examiner—Regina Y. Neal

[57] ABSTRACT

A device for reading data from or writing data to magnetic storage media, the device comprising a head having a plurality of read/write elements for reading data from or writing data to magnetic storage media in respective tracks, and a plurality of servo elements for reading servo code from the media in respective bands different from the data tracks, the read/write elements and servo elements being arranged such that a plurality of the tracks operated on by the read/write elements are disposed between two servo bands operated on by two of the servo elements.

5 Claims, 8 Drawing Sheets

DEVICE FOR READING DATA FROM OR WRITING DATA TO MAGNETIC STORAGE MEDIA AND A METHOD OF POSITIONING A TAPE HEAD RELATIVE TO THE MAGNETIC STORAGE MEDIA

FIELD OF THE INVENTION

This invention relates to recording and reading data from a magnetic media, such as a tape. More particularly, the invention relates to servo systems for use with tape, to arrangements of servo and data tracks on magnetic media and to arrangements of servo and data elements in a magnetic recording head.

BACKGROUND OF THE INVENTION

With increased computerization, more and more sensitive and valuable information is being generated and stored. The need for storage capacity is increasing. Higher capacity backup tapes are demanded.

One method for storing information on magnetic tape uses what is a known as "helical scan" technology. Helical scan tape systems cause information to be recorded in stripes that are diagonal relative to the length of a tape. The helical scan systems use a rotating drum head operating on a slowly driven tape, for high capacity. The tape is wrapped around the rotating drum.

Another method for storing information on magnetic tape uses what is known as "linear recording" technology. Linear recording tape systems cause information to be recorded in multiple parallel tracks that extend in the direction of the length of the tape. Linear recording systems use a stationary head operating on tape that is driven past the head at a speed that is typically much faster than the speed used by helical scan tape systems. With linear recording systems, multiple read/write elements can be employed in a head and can simultaneously operate on the tape.

Continuing advances in magnetic storage technology provide for constantly increasing data storage densities. The more tracks that can be fit across the width of a tape, the more information that can be stored on a tape. Thus, there is a push to increase the number of tracks across the width of a tape and to reduce the width of each track. Increasing the number of tracks or reducing the width of a track makes accurate positioning of read/write elements, and issues of tape wander more important. Therefore, servo systems are desirable in linear drive systems.

Servo systems employ information or patterns recorded along a track of the tape to accurately position read/write elements relative to data on the tape. The servo information can be used to accurately position heads relative to the length of the tape (e.g., when searching for a desired position along the length of the tape, such as the start of a file) as well as relative to the width of the tape.

Thus, servo patterns on a tape have a characteristic that changes across the width of the tape. Dual frequency servo schemes are known, in which a pattern is written with one frequency on one side of the servo track, and at a different frequency at the other side of the track. Thus, as a servo element passes over the servo track, lateral position can be determined.

Various servo systems are known in the art. For example, U.S. Pat. No. 5,432,652 (incorporated herein by reference) relates to a magnetic tape that has three evenly spaced-apart longitudinally-extending servo track areas. Four equal-sized longitudinally-extending data track areas are disposed between the servo track areas and between longitudinal edges of the tape and one of said longitudinally-extending data track areas. For track following, all servo track areas are simultaneously sensed for producing one head positioning signal.

U.S. Pat. No. 5,008,765 (incorporated herein by reference) relates to a method for reading or writing data on a tape which has a plurality of data tracks and at least a first dedicated servo track. A multiple channel head is used to access the tracks on the tape. The head is moved proximate one of a plurality of predetermined positions. The channels are located so that, in any one predetermined position of the head, one channel accesses the center of a dedicated servo track on the tape and at least two other channels will access the center of distinct data tracks.

U.S. Pat. No. 5,262,908 (incorporated herein by reference) relates to a tracking control device for a magnetic recording/reproducing apparatus arranged in such a manner that a head unit having a plurality of magnetic heads is successively moved in the widthwise direction of a magnetic tape for switching racking positions so that data recording/reproducing is, by each of the plurality of magnetic heads, performed along a plurality of data tracks formed on the magnetic tape in parallel to a direction in which the magnetic tape moves.

U.S. Pat. No. 5,574,602 (incorporated herein by reference) relates to a magnetic tape drive. A magnetic head simultaneously senses plural track lateral position indicators to generate a like plurality of independently generated sensed position error signals. The sensed position error signals are combined to provide an output position error signal that drives a positioning system to position the magnetic head laterally of the length of the magnetic tape. The output position error signal represents an average of the position errors indicated by the sensed position error signals. The quality of the sensed position error signal is monitored, eliminating poor quality signals from the output position error signal for maintaining a quality servo control.

U.S. Pat. No. 5,450,257 (incorporated herein by reference) relates to a head-track orienting system for use in magnetic recording tape drives which automatically corrects for misalignment between the head assembly and a recorded servo track on the tape. Using a servo control loop, the system calculates head-track alignment error during operation of the tape drive and either pivots the head assembly or adjusts the tape cartridge to compensate for the error. Transverse head-track positioning mechanisms are also included in the system to locate and maintain a centered position of the heads on the servo track.

It is desirable for a servo system to be able to tolerate defects in the magnetic layer of the media. For example, some tape drive systems can tolerate long scratches in a data track. So called "infinite" scratches do not cause stream failures in a data channel generated by the data track. The data tracks are recovered using error control code techniques known in the art. It is desirable to have servo systems that can tolerates defects in the servo track as capably as the defects in the data track are tolerated. It is therefore desirable to have servo systems that can tolerate long scratches in a servo track and scratches or other defects extending in the direction of the width of the tape.

SUMMARY OF THE INVENTION

The invention provides a device for reading data from or writing data to magnetic storage media. The device comprises a head having a plurality of read/write elements for reading data from or writing data to magnetic storage media in respective tracks, and a plurality of servo elements for reading servo code from the media in respective bands different from the data tracks. The read/write elements and servo elements are arranged such that a plurality of the tracks operated on by the read/write elements are disposed between two servo bands operated on by two of the servo elements.

One aspect of the invention provides a method of positioning a tape head relative to desired tracks on a tape. The method comprises writing a plurality of servo bands on the tape and writing data in multiple tracks between the servo bands. The method further comprises providing a plurality of read/write elements on the head, and providing servo elements on the head capable of reading both servo bands while the read/write elements read or write to the tape.

In one aspect of the invention, the servo elements and read/write elements are arranged on the head in columns, wherein, in each column, all of the read/write elements are located intermediate two servo elements.

In one aspect of the invention, the read/write elements of one of the columns are used to write to the tracks while the read/write elements of the second column read from those tracks to verify that data was correctly written.

In one aspect of the invention, signals read from both servo bands are compared. The offset of one column relative to the other column with respect to the tracks is calculated using the compared signals. The calculated offset is used to position the head to write to desired tracks.

In one aspect of the invention, signals read from both servo bands are compared, and lateral expansion of a tape is calculated using the comparison.

In one aspect of the invention, signals read from both servo bands are compared and the comparison is used to determine whether the head azimuth angle is within tolerance relative to the direction of tape travel.

DESCRIPTION OF THE DRAWINGS

Preferred embodiments of the invention are described below with reference to the following accompanying drawings depicting examples embodying the best mode for practicing the invention.

DETAILED DESCRIPTION OF THE INVENTION

This disclosure of the invention is submitted in furtherance of the constitutional purposes of the U.S. Patent Laws "to promote the progress of science and useful arts". U.S. Constitution, Article 1, Section 8.

Figure 1:
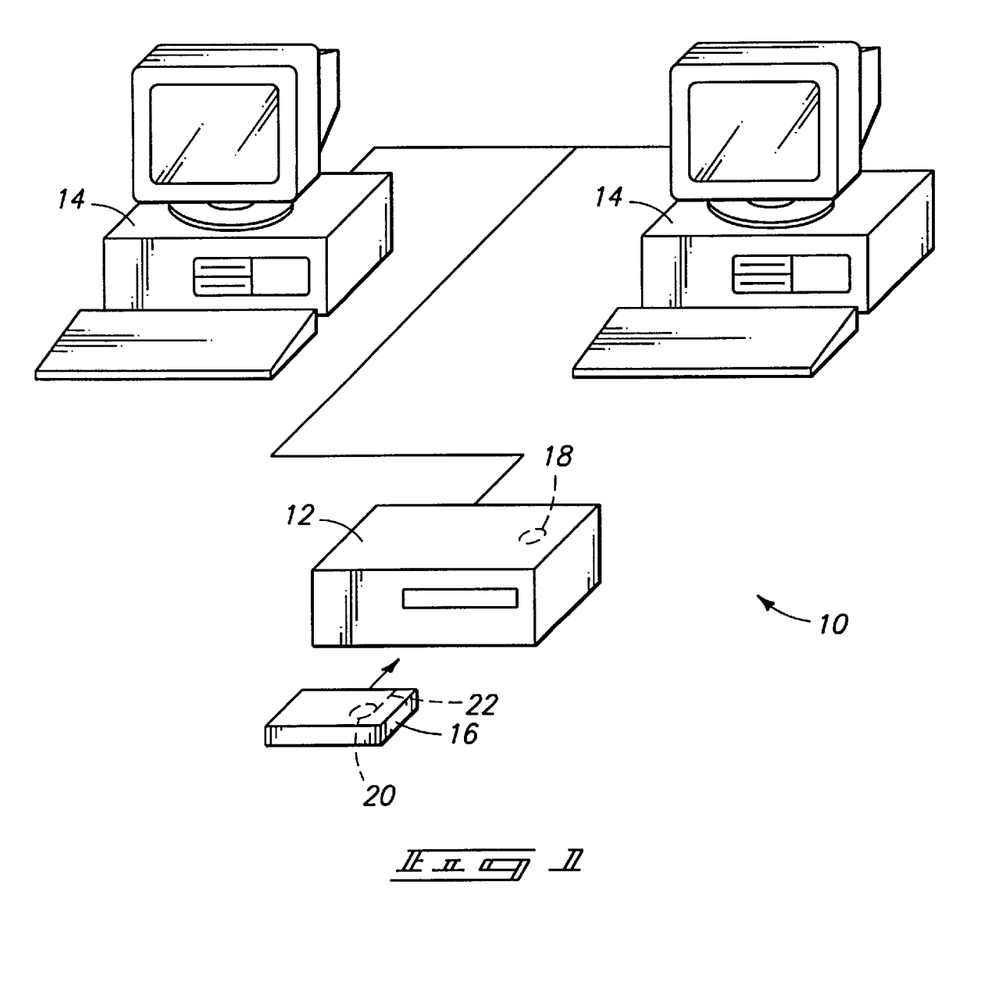
FIG. 1 is a perspective view of a computer network embodying the invention and including a data storage device.

FIG. 1 shows a computer network 10 including a data storage device or system 12 embodying the invention, and including one or more computers 14. The data storage device 12 reads data from and writes data to magnetic storage media. In one embodiment, the data storage device 12 is a stand alone tape drive. In another embodiment, the data storage device 12 is supported in a bay inside a housing of a computer 14 which forms a part of the network 10. In the illustrated embodiment, the data storage device 12 is a linear recording tape drive. Although the invention is illustrated as being employed in a computer data storing tape drive system in FIG. 1, the invention has a wide variety of applications. For example, some aspects of the invention can be used in connection with other storage media, for storing either analog or digital information. Some aspects of the invention can be embodied, for example, in connection with any of a variety of types of storage devices, including disk storage devices. For purposes of illustration, the invention will be described in connection with a computer tape drive.

The tape drive 12 is used with tape cartridges 16. In the illustrated embodiment, the tape cartridge 16 is a single reel type tape cartridge, and includes a reel 20, and tape 22 wound on the reel 20. A second reel 18 is included in the tape drive 12 and engages the tape 22. In an alternative embodiment, the tape cartridge 16 includes two reels. In the illustrated embodiment, the tape 22 has a width W of one half inch. The tape 22 also has a length in a direction perpendicular to the width W of the tape. A plurality of parallel tracks 24A, 24B, 24C, 24D, 24E, 24F, 24G, 24H, 24I, 24J, 24K, and 24L (24A–L) are defined across the width of the tape 22. The tracks 24A–L extend in the direction of the length of the tape 22.

Figure 2:
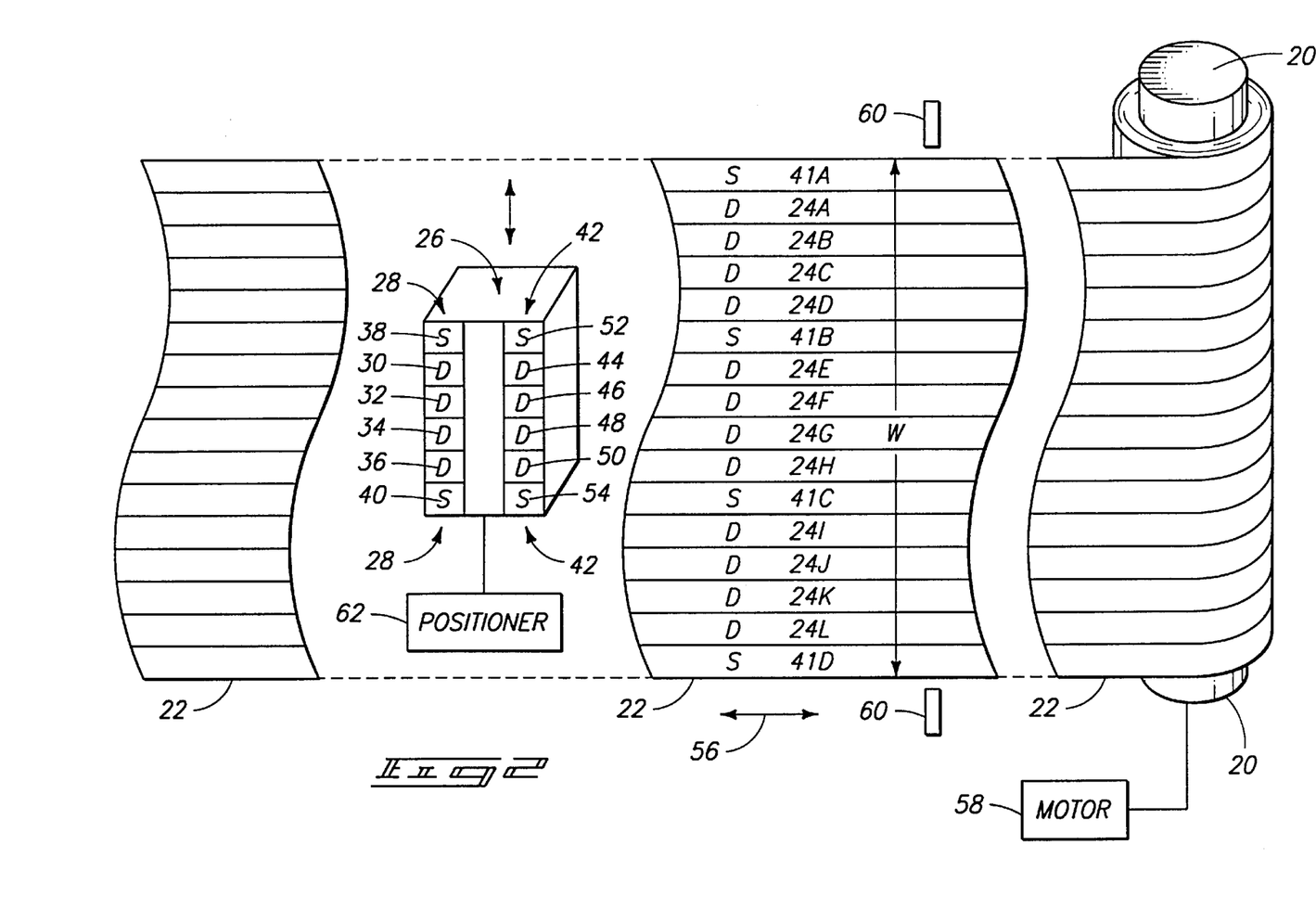
FIG. 2 is a diagrammatical perspective view illustrating an arrangement of servo elements and read/write elements on a head in the data storage device, and illustrating an arrangement of data tracks and servo bands on a magnetic recording medium on which the head operates.

The tape drive 12 includes a tape head 26 having a first bump 28 including a plurality of read/write elements 30, 32, 34, and 36 for reading data from or writing data to the tape in the parallel tracks 24, and a plurality of servo elements 38, and 40 for reading servo code from the tape in parallel bands 41A, 41B, 41C, and 41D different from the data tracks 24. In the illustrated embodiment, the servo code is pre-written to the parallel bands 41A, 41B, 41C, and 41D by another servo writer that may or may not be included in the tape drive 12. In another embodiment, the servo elements 38 and 40 are used for writing servo code to the parallel bands.

In FIG. 2, three sets of parallel data tracks are shown. However, various numbers of sets of data tracks can be employed. For example, in one embodiment, there are thirteen sets of data tracks, and an appropriate number of servo bands (e.g., with each of the thirteen sets of data tracks being located between two servo bands). Other numbers of sets can also be employed.

In the illustrated embodiment, the first bump 28 has four read/write elements, and two servo elements; however, in alternative embodiments, different numbers of read/write elements, or additional servo elements can be employed. In the illustrated embodiment, a "bump" is an area on the head having a column of (read/write and/or servo) elements. It is called a "bump" because it typically protrudes relative to the rest of the head. However, in the following disclosure and claims, the term "bump" is not to be construed so as to necessarily require protrusion relative to the rest of the head.

In FIG. 2, the read/write elements and servo elements are arranged with the four read/write elements 30, 32, 34, and 36, between the two servo elements 38 and 40. In the illustrated embodiment, the servo elements 38 and 40 are respectively of a physical construction identical to the physical construction of the read/write elements 30, 32, 34, and 36.

The tape head further has a second bump 42 including a plurality read/write elements 44, 46, 48, and 50 for reading data from or writing data to the tape in the parallel tracks 24, and two servo elements 52 and 54 for reading servo code from the tape in parallel bands. In the illustrated embodiment, the servo code is pre-written to the parallel bands 41A, 41B, 41C, and 41D by another servo writer that may or may not be included in the tape drive 12. In another embodiment, the servo elements 52 and 54 are used for writing servo code to the parallel bands.

In the illustrated embodiment, the second bump 42 has four read/write elements, and two servo elements; however, in alternative embodiments, different numbers of read/write elements, or additional servo elements can be employed.

The read/write elements 44, 46, 48, and 50, and servo elements 52 and 54 of the second bump 42 are arranged with the four read/write elements 44, 46, 48, and 50 of the second bump 42 between the two servo elements 52 and 54 of the second bump 42. The servo elements 52 and 54 of the second bump are respectively of a physical construction identical to the physical construction of one of the read/write elements 44, 46, 48, and 50.

The tape drive 12 is configured to drive the length of the tape 22 in either of a first and second direction relative to the head 26, as indicated by arrow 56. More particularly, the tape drive 12 includes at least one motor 58 which moves the tape 22 relative to the head 26. For example, in the illustrated embodiment, one motor 58 drives one of the reels 18 or 20, and another motor (not shown) drives the other of the reels 18 or 20. In an alternative embodiment, a capstan drives the tape. The tape drive 12 may include conventional components such as tapes guides 60.

The servo and read/write elements of the second bump 42 are respectively parallel to the servo and read/write elements of the first bump 28, as shown in FIG. 2. In one embodiment, when the tape is traveling in the first direction (e.g., to the right in FIG. 2) and it is desired to write to the tape, the servo element 52 of the second bump 42 reads servo code from the servo band 41B on the tape to produce a servo signal, the read/write element 30 of the first bump 28 writes data to the track 24E, the read/write element 44 of the second bump 42 reads data from the track 24E, the read/write element 32 of the first bump 28 writes data to the track 24F, the read/write element 46 of the second bump 42 reads data from the track 24F, the read/write element 34 of the first bump 28 writes data to the track 24G, the read/write element 48 of the second bump 42 reads data from the track 24G, the read/ write element 36 of the first bump 28 writes data to the track 24H, the read/write element 50 of the second bump 42 reads data from the track 24H, and the servo element 54 of the second bump 42 reads servo code from the servo band 41C to produce a servo signal.

When the tape is traveling in the second direction (e.g., to the left in FIG. 2) and it is desired to write to the tape, the servo element 38 of the first bump 28 reads servo code from the servo band 41B on the tape to produce a servo signal, the read/write element 30 of the first bump 28 reads data from the track 24E, the read/write element 44 of the second bump 42 writes data to the track 24E, the read/write element 32 of the first bump 28 reads data from the track 24F, the read/ write element 46 of the second bump 42 writes data to the track 24F, the read/write element 34 of the first bump 28 reads data from the track 24G, the read/write element 48 of the second bump 42 writes data to the track 24G, the read/write element 36 of the first bump 28 reads data from the track 24H, the read/write element 50 of the second bump 42 writes data to the track 24H, and the servo element 40 of the first bump 28 reads servo code from the servo band 41C to produce a servo signal.

Figure 3:
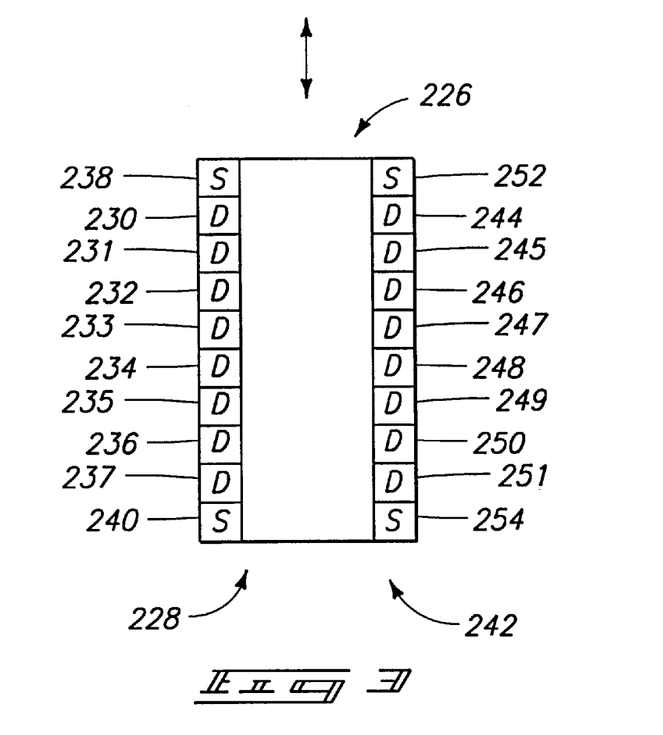
FIG. 3 is a diagrammatical perspective view illustrating an arrangement of servo elements and read/write elements on an alternative head in the data storage device in accordance with an alternative embodiment of the invention.

FIG. 3 shows a head 226 in accordance with an alternative embodiment of the invention, wherein each of two bumps 228 and 242 includes eight read/write elements and two servo elements. More particularly, the first bump 228 of the head 226 includes servo elements 238 and 240, and read/ write elements 230, 231, 232, 233, 234, 235, 236, and 237 between the servo elements 238 and 240, and the second bump 242 of the head 226 includes servo elements 252 and 254, and read/write elements 244, 245, 246, 247, 248, 249, 250 and 251 between the servo elements 252 and 254. The head 226 operates on a tape having, of course, eight data tracks between each pair of servo bands.

By employing two servo elements for reading from two servo bands, defects in the tape can be tolerated. Because the servo elements bracket the read/write elements, tape defects of maximum widths can be tolerated. If one servo band on the tape is corrupted, the other servo band is used.

Figure 4:
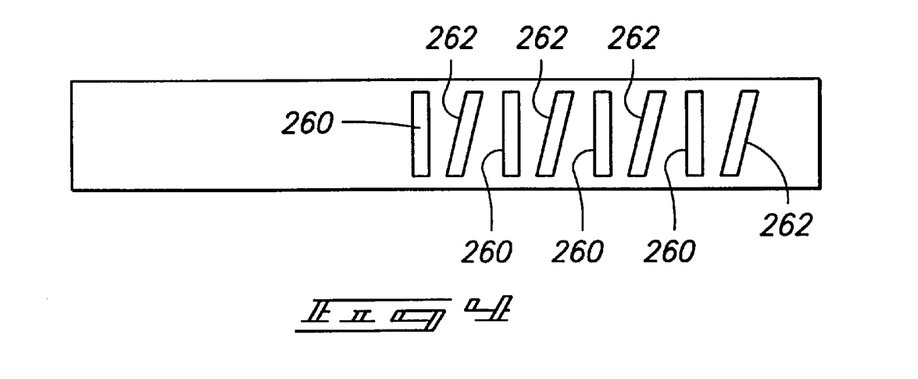
FIG. 4 is a diagrammatical view illustrating a servo band included in the magnetic recording medium shown in FIG. 2.

FIG. 4 illustrates a servo band configuration that could be employed in one embodiment of the invention for a servo band 41A, 41B, 41C, or 41D. This servo band configuration is a servo band configuration which provides both an indication of position (and speed) in the direction of travel of the tape, and an indication of lateral position of the tape relative to the servo element reading the servo band. The tape drive 12 includes a timing based demodulation scheme for sensing the servo information on the tape. The position of the head 26 relative to the tape width is derived from the relative timing of azimuthally sloped transitions 260 and 262. The servo code thus includes two elements: synchonization transitions 260, which are written with a zero degree azimuth angle, and positioning transitions 262, which are written at some azimuth angle other than zero (e.g., written at ten degrees azimuth angle). The time difference between synchronization and positioning read back pulses generated using a servo element is used to indicate the servo element's position in a servo band. By using a high resolution timing measurement, a high resolution position measurement is achieved. See European Patent Application EP 0690442 A2 for detailed information regarding servo systems that could be employed in the tape drive 12.

In an alternative embodiment, the pattern is written with one frequency on one side of the band, and another frequency on the other side of the band, and the position of the head 26 in the direction of the width W of the tape is determined by the relative strengths of the two signals.

The tape drive 12 further includes a positioner 62 which is mechanically coupled to the head and positions or moves the head in the direction of the width of the head to move the head between various positions for reading or writing to different tracks. For example, in a first position, the servo element 38 is positioned to operate on the servo band 41A and the servo element 40 is positioned to operate on the servo band 41B; in a second position, the servo element 38 is positioned to operate on the servo band 41B and the servo element 40 is positioned to operate on the servo band 41C; and in a third position, the servo element 38 is positioned to operate on the servo band 41C and the servo element 40 is positioned to operate on the servo band 41D. This leads into a discussion of but one advantage of the invention. The illustrated arrangement of servo elements and data elements on the head makes for efficient use of available space on the tape for servo bands. Servo bands are spaced on the tape to match the distance between the servo elements on the head. It is thus possible to share bands between one data track set and the adjacent data track set. This tape configuration has no more servo overhead than would a system that used only a single servo element per bump, except for one extra servo band at one of the edges of the tape.

The positioner 62 also moves the head in the direction of the width of the tape to make minute corrections to ensure that the read/write elements are accurately positioned over desired tracks during reading or writing operations. In the illustrated embodiment, the positioner 62 comprises a voice coil motor; however, any other head positioner known in the art can be employed.

Figure 5:
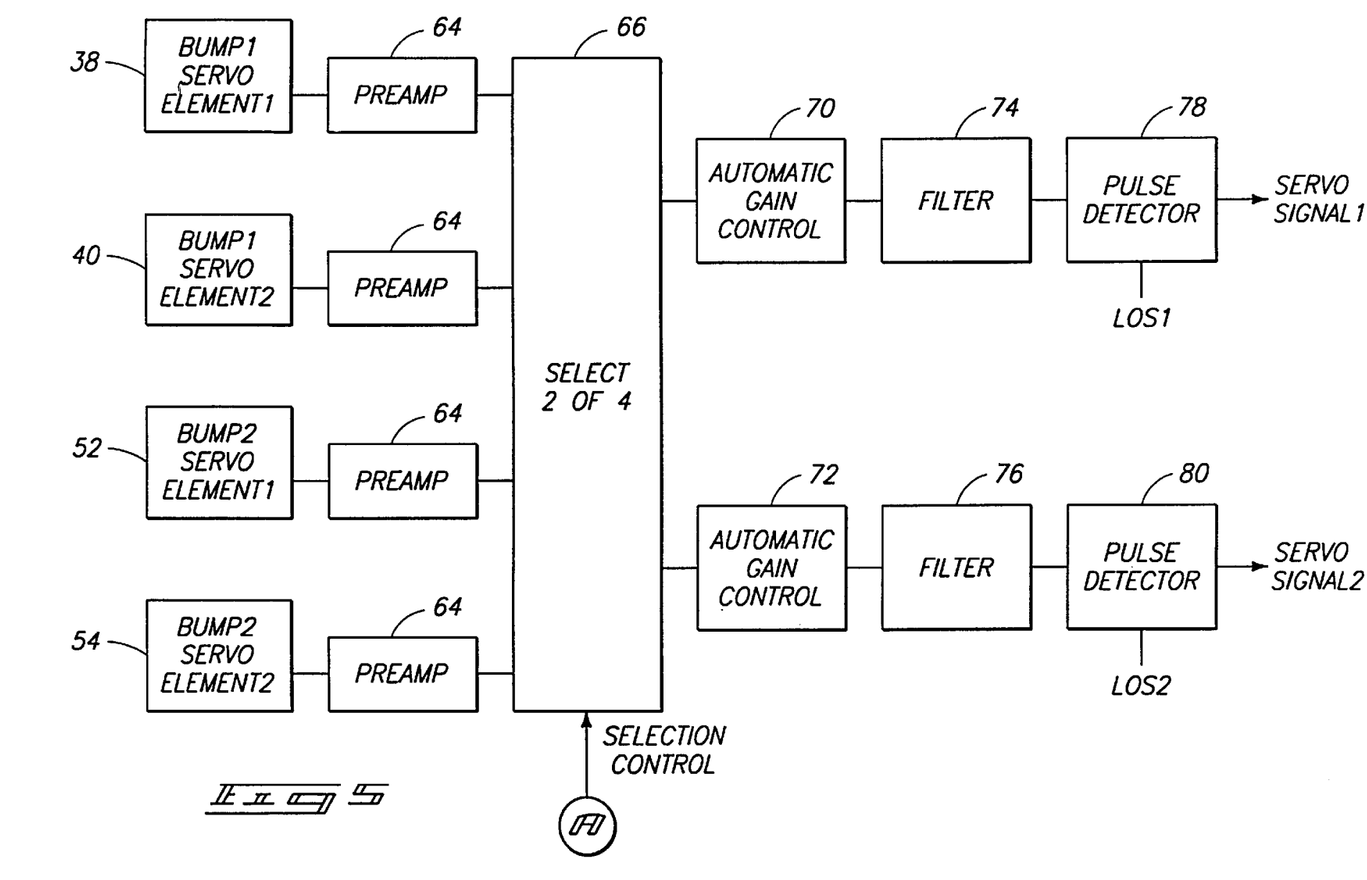
FIGS. 5–6 provide a block diagram illustrating a servo system including the servo elements of FIG. 2, for maintaining the position of the head relative to desired tracks and bands of the magnetic recording medium, and for maintaining the speed of travel of the magnetic recording medium relative to the head.
Figure 6:
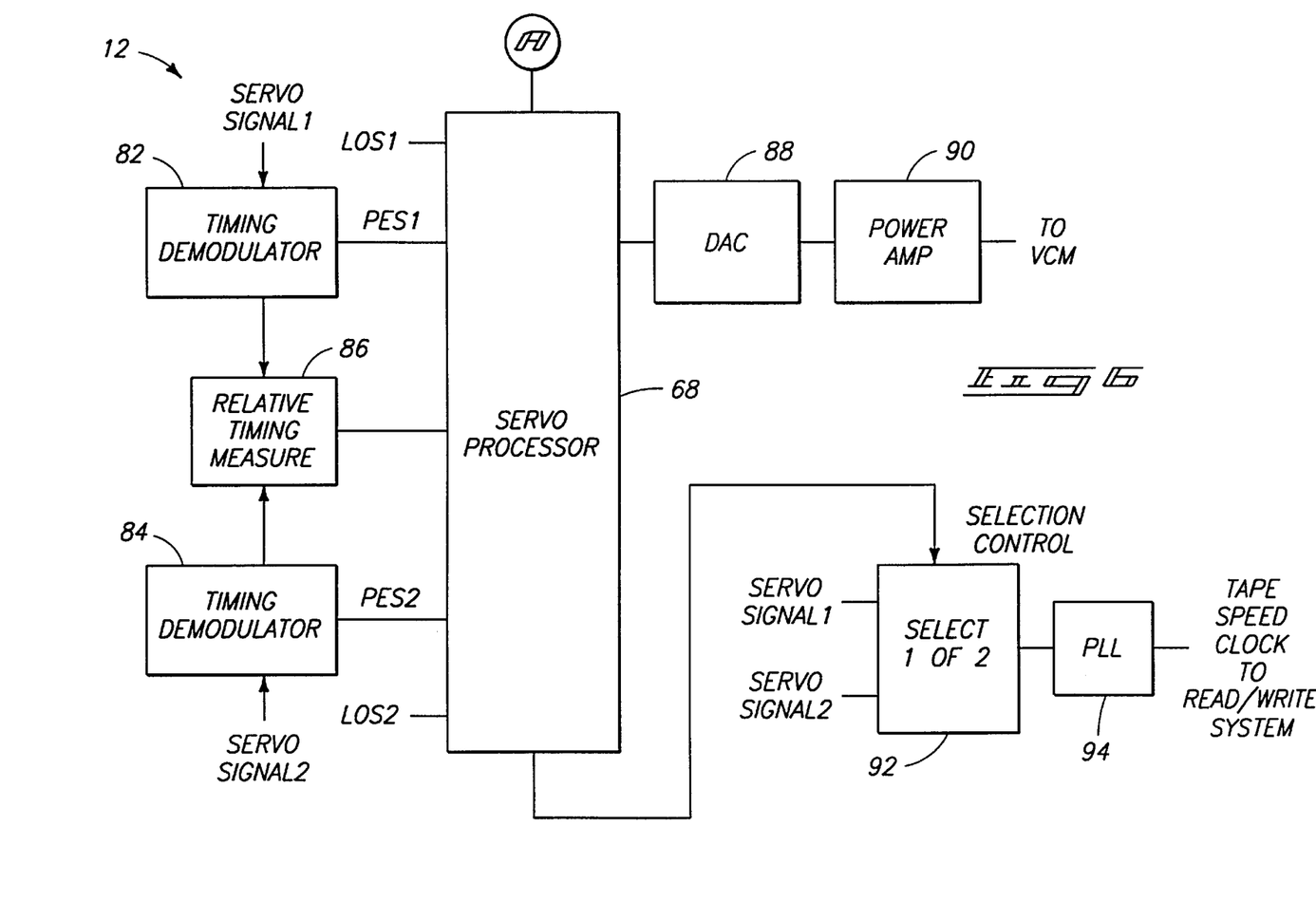

As shown in FIGS. 5–6, the tape drive 12 includes preamps 64 respectively coupled to the servo elements 38, 40, 52, and 54, and amplifying servo signals read by the servo elements which are reading servo code. This will be either the elements 38 and 40, or the elements 52 and 54, depending on the direction of tape travel, as described above. More particularly, the tape drive 12 includes a selection or switching circuit 66, coupled to the preamps 64, and enabling or using the preamps associated with the servo elements which are reading the servo code.

The tape drive 12 further includes a servo processor 68 which sends a selection control signal to the circuit 66 to select the appropriate pair of preamps depending on the direction of tape travel.

The tape drive 12 further includes automatic gain control circuits 70 and 72 respectively coupled to the preamps associated with the servo elements which are reading the servo code. The tape drive 12 also includes filters 74 and 76 respectively coupled to the automatic gain control circuits 70 and 72 to filter the signals produced by the automatic gain control circuits. In the illustrated embodiment, the filters 74 and 76 are band pass filters, and are used to remove noise. The tape drive 12 further includes first and second pulse detectors 78 and 80 respectively coupled to the filters 74 and 76. The pulse detectors produce servo signals, "SERVO SIGNAL1" and "SERVO SIGNAL2." The pulse detectors also determine if either of the servo bands is corrupted. If so, the pulse detector associated with the servo element reading the corrupted servo band produces a signal LOS1 or LOS2 signifying there is a loss of signal. This loss of signal information is passed to the servo processor so it can determine whether to use the signal produced by one servo element or another. In one embodiment, if neither servo band is corrupted, servo information from both of the servo elements that are reading servo code is used, and is combined mathematically (e.g., averaged in one embodiment).

The tape drive 12 further includes timing demodulators 82 and 84 which receive timing signals "SERVO SIGNAL1" and "SERVO SIGNAL2" produced by the pulse detectors. The timing demodulators 82 and 84 produce respective position error signals PES1 and PES2 which are passed to the servo processor 68. The tape drive 12 further includes a relative timing measure circuit 86 coupled to the timing demodulators 82 and 84, and which determines the difference in timing error signals produced by the timing demodulators 82 and 84. This Delta Time signal is also passed to the servo processor 68. The servo processor 68 uses the signals from the timing demodulator 82, the timing demodulator 84, and the relative time measure circuit 86 to accurately position the head 26 over the tracks from which the read/write elements are reading or to which the read/write elements are writing. More particularly, the tape drive 12 includes a digital to analog converter 88 coupled to the servo processor and providing an analog signal. The tape drive 12 further includes a power amplifier 90 coupled to the digital to analog converter 88 and amplifying the analog output of the digital to analog converter to a value sufficient to drive the positioner 62. More particularly, in the illustrated embodiment, the power amplifier 90 is coupled to the voice coil motor.

The tape drive 12 further includes a selection circuit or switching circuit 92 controlled by the servo processor 68. The circuit 92 is coupled to the pulse detectors 78 and 80, and the servo processor selects the appropriate pulse detector output by monitoring the LOS1 and LOS2 signals and determining whether and which servo signal has been lost. The tape drive 12 further includes a phase locked loop 94 coupled to the circuit 92. The phase locked loop provides a tape speed clock which is used as a clock to write data to the tape. The tape speed clock can also be used in maintaining the speed of tape travel or can be used as a read reference clock.

Figure 7:
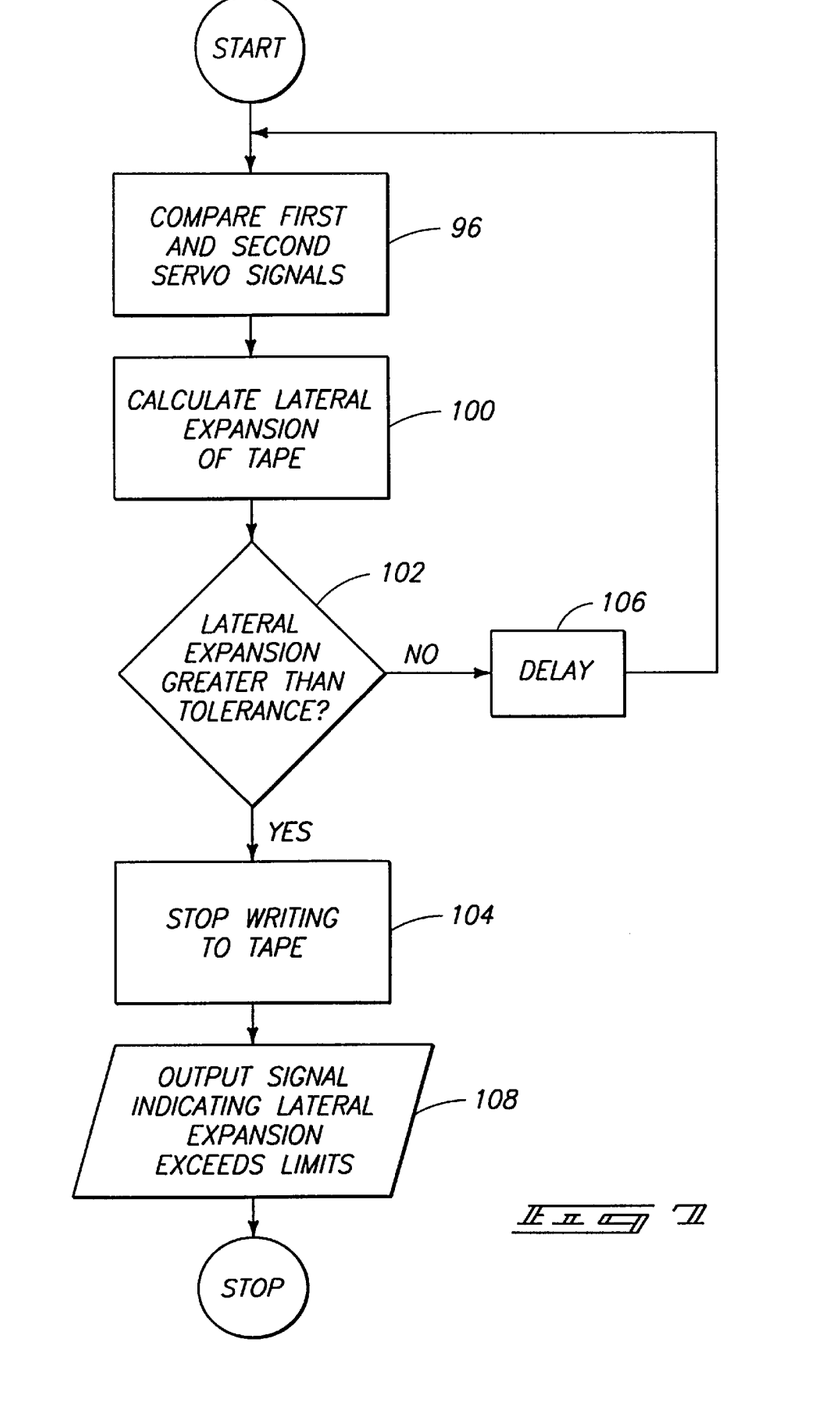
FIG. 7 is a flowchart illustrating how the arrangement of read/write elements and servo elements is used for determining expansion or contraction of a tape in a direction normal to the direction of tape travel, in embodiments where tape is the magnetic recording medium.

FIG. 7 illustrates a method of calculating lateral expansion or contraction of the tape. Because of the configuration of the servo band (see FIG. 4 and discussion relating thereto), and because two servo elements are employed to simultaneously read servo code, lateral expansion or contraction of the tape can be calculated by a processor. More particularly, lateral expansion or contraction of the tape is calculated by taking the difference of position signals generated by the two servo elements that are reading servo code. These servo elements are spaced apart in the direction of the width of the tape.

In the method of FIG. 7, in a step 96, the first and second servo signals generated by the servo elements which are reading servo code are compared. After performing step 96, the processor proceeds to step 100.

In step 100, lateral expansion or contraction of the tape is calculated by subtracting PES2 from PES1. After performing step 100, the processor proceeds to step 102.

In step 102, a determination is made as to whether the calculated lateral expansion or contraction is greater than a tolerance value (e.g. greater than a predetermined value). If so the processor proceeds to step 104; if not, the processor proceeds to step 106.

In step 104, writing to the tape is stopped. After performing step 104, the processor proceeds to step 108.

In step 106, the processor delays before returning to step 96.

In step 108, the processor outputs a signal indicating that lateral expansion or contraction exceeds limits. After performing step 108, execution stops until a new tape is loaded, or until a predetermined amount of time passes. The order of certain steps can be varied. For example, the order of execution of steps 104 and 108 can be reversed.

Figure 8B:
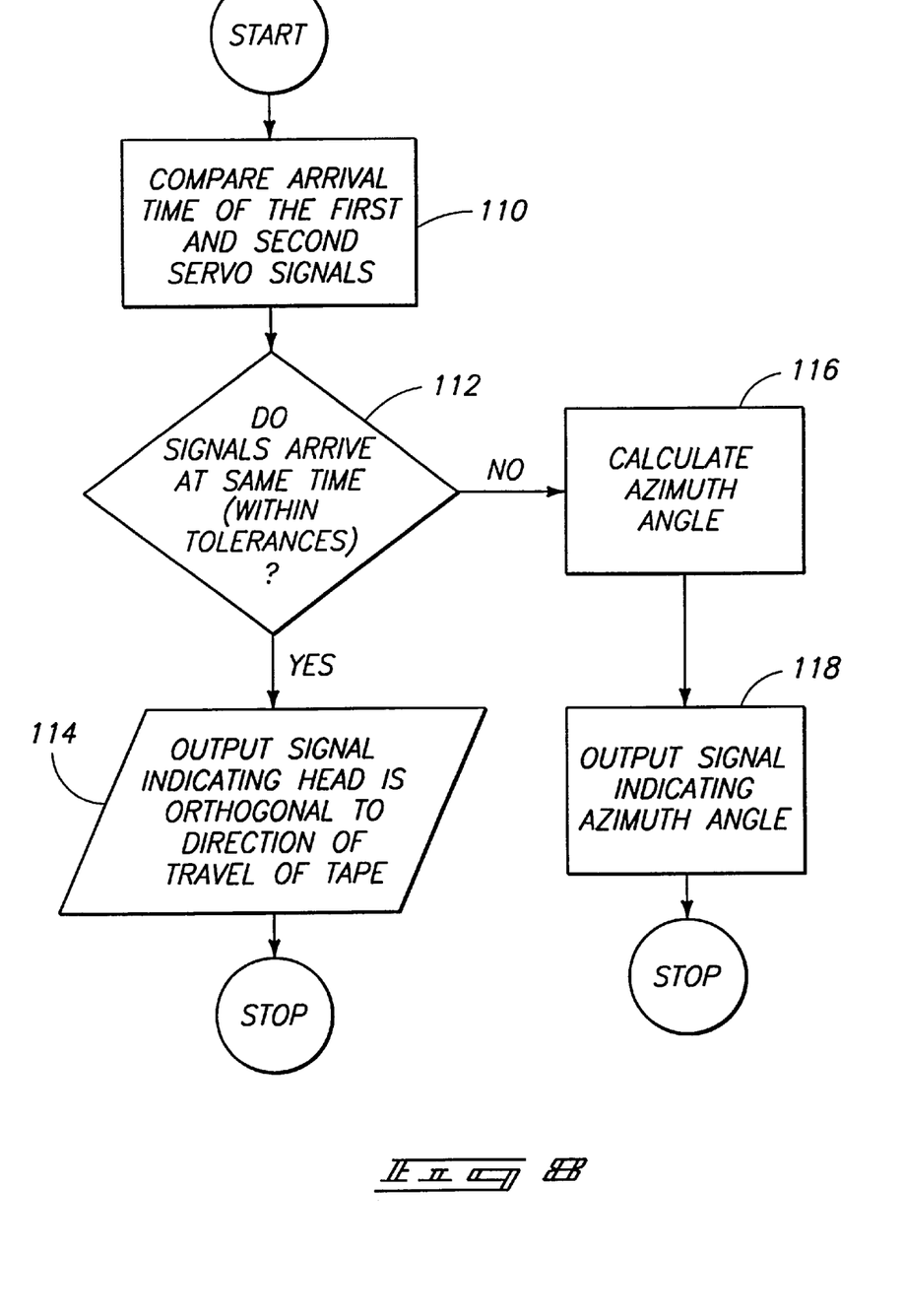
FIG. 8 is a flowchart illustrating how the arrangement of read/write elements and servo elements is used for determining azimuth angle of the head.

FIG. 8 illustrates a method of determining azimuth angle of the head about an axis normal to the plane of the tape. Because of the configuration of the servo band (see FIG. 4 and discussion relating thereto), and because two servo elements are employed to simultaneously read servo code, azimuth angle of the head can be calculated by a processor.

In the method of FIG. 8, in a step 110, the arrival time of first and second servo signals generated by the servo elements which are reading servo code are compared. For example, the servo signals from servo elements 38 and 40 or 52 and 54 are used. The arrival times of the servo signals from these servo elements should be the same. If not, the head is at an angle. After performing step 110, the processor proceeds to step 112.

In step 112, a determination is made as to whether the signals arrive at the same time, within tolerances. If so the processor proceeds to step 114. If not, the processor proceeds to step 116.

In step 114, the processor outputs a signal indicating that the head is orthogonal to the direction of tape travel. After performing step 114, execution stops.

In step 116, azimuth angle is calculated. After performing step 116, execution proceeds to step 118.

In step 118, the processor outputs azimuth angle. After performing step 118, execution stops. Correction can be made. For example, the angle of the head can be adjusted.

Figure 9:
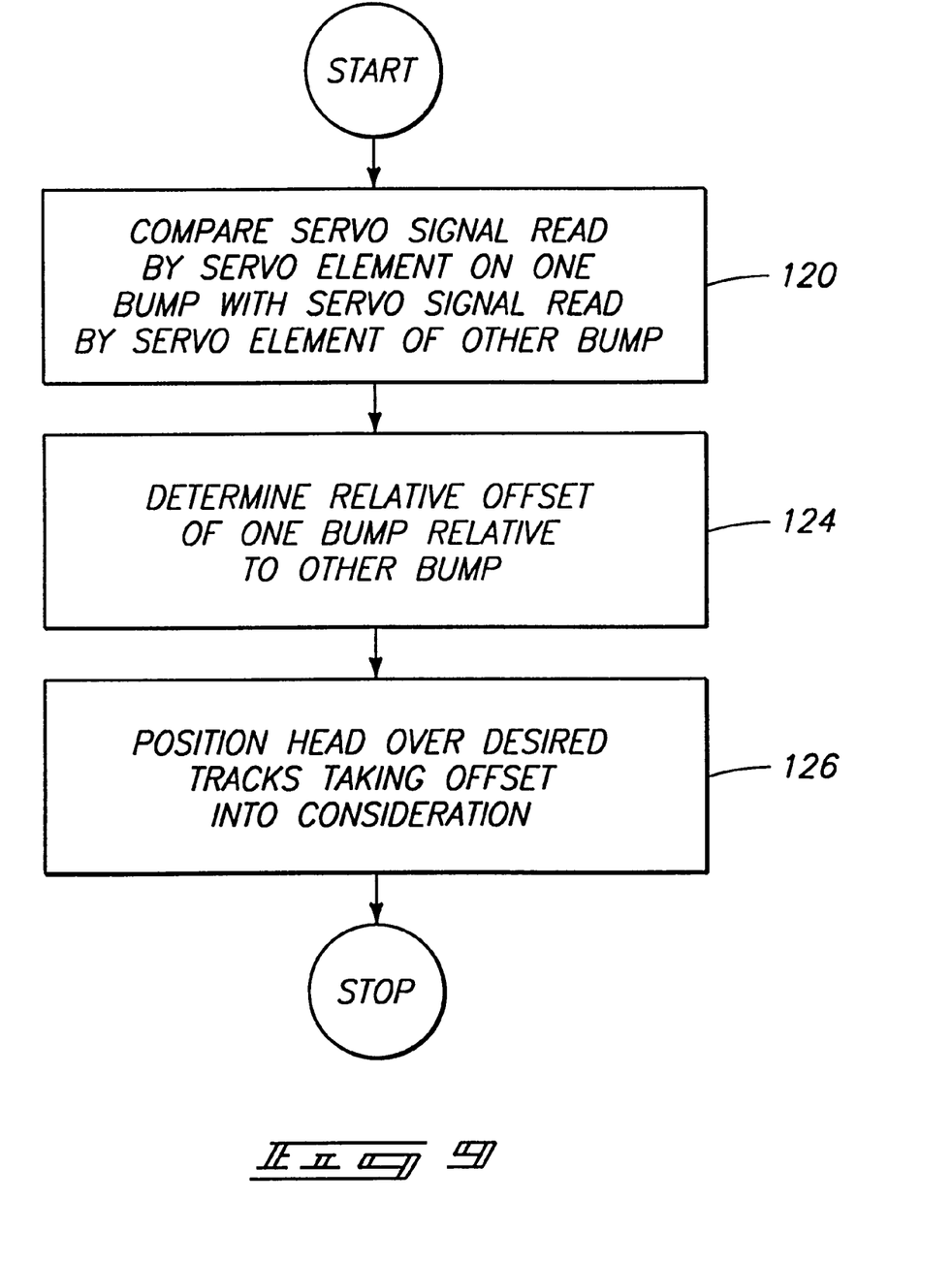
FIG. 9 is a flowchart illustrating how the arrangement of read/write elements and servo elements is used for determining relative offset of one bump relative to another bump in a direction normal to the direction of travel of the magnetic recording medium relative to the head.

FIG. 9 illustrates a method of determining relative offset of one bump relative to the other bump. Because of the configuration of the servo band (see FIG. 4 and discussion relating thereto), and because two servo elements are employed to simultaneously read servo code, relative offset of the one bump relative to the other bump can be calculated by a processor. In the illustrated embodiment, when the read/write elements of one bump are writing, the servo elements of the other bump are reading.

In the method of FIG. 9, in a step 120, the servo signal read by a servo element 38 on one bump is compared with the servo signal read by a servo element 52 on the other bump. After completing step 120, the processor proceeds to step 124.

In step 124, a determination is made as to the relative offset of one bump relative to the other bump. To measure relative offset, PES2 is subtracted from PES1 using servo elements that are in the same relative positions on different bumps. After performing step 124, the processor proceeds to step 126.

In step 126, the servo position of the head is controlled, and the head is positioned over desired tracks taking the offset into consideration.

Thus, a configuration of read/write elements and servo elements has been provided for a data storage device which allows a servo system to tolerate large defects and scratches in a magnetic medium because the servo elements are far apart. In fact, an entire servo band could be missing, and the data storage device can still function.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of positioning a tape head relative to desired tracks of a tape, the method comprising:

writing a plurality of servo bands on the tape and writing data in multiple tracks between the servo bands, after writing the plurality of servo bands;

providing a plurality of read/write elements on the head, and providing servo elements on the head capable of reading both servo bands while the read/write elements read or write to the tape, the servo elements and read/write elements being arranged on the head in columns, such that, in each column, all of the read/write elements are located intermediate two servo elements; and comparing signals read from the servo bands and calculating lateral expansion of the tape using the comparison.

2. A method in accordance with claim 1 and further comprising using the read/write elements of one of the columns to write to the tracks while the read/write elements of the second column read from those tracks to verify that data was correctly written.

3. A method in accordance with claim 1 wherein the head is constructed such that the first column includes exactly four read/write elements and exactly two servo elements.

4. A method in accordance with claim 1 and further comprising comparing signals read from the servo bands, calculating offset of one column relative to the other column with respect to the tracks, using the compared signals, and using the calculated offset to position the head to write to desired tracks.

5. A method in accordance with claim 1 and further comprising comparing signals read from the servo bands and determining whether the head azimuth angle is within tolerance relative to the direction of tape travel using the comparison.

\* \* \* \* \*